United States Patent
Zhang et al.

(10) Patent No.: US 10,693,403 B2
(45) Date of Patent: Jun. 23, 2020

(54) TORSIONAL DAMPING FOR GENERATORS

(71) Applicant: GE AVIATION SYSTEMS LLC, Grand Rapids, MI (US)

(72) Inventors: Jinhui Zhang, Dayton, OH (US); Paul Robert Gemin, Cincinnati, OH (US); Arthur Vorwerk Radun, Mason, OH (US)

(73) Assignee: GE AVIATION SYSTEMS LLC, Grand Rapids, MI (US)

( * ) Notice: Subject to any disclaimer, the term of this patent is extended or adjusted under 35 U.S.C. 154(b) by 76 days.

(21) Appl. No.: 15/467,471

(22) Filed: Mar. 23, 2017

(65) Prior Publication Data

US 2018/0278188 A1 Sep. 27, 2018

(51) Int. Cl.
| | |
|---|---|
| *F02D 29/06* | (2006.01) |
| *H02P 9/04* | (2006.01) |
| *H02P 9/00* | (2006.01) |
| *F01L 15/10* | (2006.01) |
| *H02K 7/18* | (2006.01) |
| *H02P 9/02* | (2006.01) |
| *F02C 7/32* | (2006.01) |
| *F01L 25/04* | (2006.01) |

(52) U.S. Cl.
CPC .............. *H02P 9/006* (2013.01); *F01L 15/10* (2013.01); *F01L 25/04* (2013.01); *F02C 7/32* (2013.01); *H02K 7/1823* (2013.01); *H02P 9/02* (2013.01)

(58) Field of Classification Search
CPC ....................................................... F01D 15/10
See application file for complete search history.

(56) References Cited

U.S. PATENT DOCUMENTS

| | | | |
|---|---|---|---|
| 3,598,211 A * | 8/1971 | Fergle ................. | F16D 25/0638 |
| | | | 192/103 F |
| 4,531,361 A | 7/1985 | Zagranski et al. | |
| 7,285,871 B2 * | 10/2007 | Derouineau .............. | F02C 9/26 |
| | | | 290/52 |
| 7,423,411 B2 * | 9/2008 | Sihler ..................... | H02P 23/04 |
| | | | 322/19 |
| 7,518,344 B2 | 4/2009 | Sihler | |
| 8,217,630 B2 | 7/2012 | Markunas et al. | |

(Continued)

FOREIGN PATENT DOCUMENTS

| | | |
|---|---|---|
| CN | 1806384 A | 7/2006 |
| CN | 101277018 A | 10/2008 |

(Continued)

OTHER PUBLICATIONS

Chinese Patent Office, Office Action re Chinese Application No. 201810249496.4, dated Dec. 3, 2019, 13 pages, China.

*Primary Examiner* — Tulsidas C Patel
*Assistant Examiner* — Thomas K Quigley
(74) *Attorney, Agent, or Firm* — McGarry Bair PC

(57) ABSTRACT

An apparatus and method for a generator assembly for a drive train such as a rotatable turbine engine assembly. The generator assembly includes at least first and second generators mechanically coupled to the drive train. First and second dampers are operably coupled to the first and second generators, respectively, to selectively damp the first and second generators. Damping the first and second generators can reduce or eliminate both common mode and differential mode torsional oscillations from the generators to the drive train.

25 Claims, 8 Drawing Sheets

(56) References Cited

U.S. PATENT DOCUMENTS

| | | | |
|---|---|---|---|
| 9,303,716 B2 | 4/2016 | Maranville et al. | |
| 9,548,639 B2 | 1/2017 | Goi et al. | |
| 9,938,853 B2* | 4/2018 | Gemin | F01D 15/10 |
| 2007/0279012 A1* | 12/2007 | Sihler | H02P 23/04 |
| | | | 322/20 |
| 2009/0000912 A1 | 1/2009 | Battles et al. | |
| 2009/0001940 A1* | 1/2009 | Sihler | H02J 3/24 |
| | | | 322/58 |
| 2010/0038473 A1 | 2/2010 | Schneider et al. | |
| 2010/0141193 A1* | 6/2010 | Rotondo | F01D 15/08 |
| | | | 318/432 |
| 2011/0115444 A1* | 5/2011 | Markunas | H02P 9/102 |
| | | | 322/19 |
| 2012/0214605 A1 | 8/2012 | Snook et al. | |
| 2014/0338352 A1* | 11/2014 | Edwards | F02C 3/113 |
| | | | 60/774 |
| 2015/0035501 A1 | 2/2015 | Rozman et al. | |
| 2016/0218650 A1* | 7/2016 | Gajanayake | F01D 15/10 |
| 2017/0114664 A1* | 4/2017 | Gemin | F01D 5/026 |
| 2017/0114665 A1* | 4/2017 | Gemin | F01D 15/10 |
| 2017/0222518 A1* | 8/2017 | Gemin | F01D 5/026 |

FOREIGN PATENT DOCUMENTS

| | | |
|---|---|---|
| CN | 102148492 A | 8/2011 |
| CN | 102678819 A | 9/2012 |
| CN | 104335460 A | 2/2015 |

* cited by examiner

TORSIONAL DAMPING FOR GENERATORS

BACKGROUND OF THE INVENTION

A gas turbine engine generally includes, in serial flow order, a compressor section, a combustion section, a turbine section, and an exhaust section. In operation, air enters an inlet of the compressor section where one or more axial compressors progressively compress the air until it reaches the combustion section. Fuel is mixed with the compressed air and burned within the combustion section to provide combustion gases. The combustion gases are routed from the combustion section through a hot gas path defined within the turbine section and then exhausted from the turbine section via the exhaust section.

In particular configurations, the turbine section includes, in serial flow order, a high pressure (HP) turbine and a low pressure (LP) turbine. The HP turbine and the LP turbine each include various rotatable turbine components such as turbine rotor blades, rotor disks and retainers, and various stationary turbine components such as stator vanes or nozzles, turbine shrouds and engine frames. The rotatable and the stationary turbine components at least partially define the hot gas path through the turbine section. As the combustion gases flow through the hot gas path, thermal energy is transferred from the combustion gases to the rotatable turbine components and the stationary turbine components.

Gas turbine engines and other types of turbo-machinery are often used to drive loads such as electrical generators. Gas turbine engines and other large drive train systems have a moment of inertia, a torsional stiffness, and natural damping. The low mechanical damping in high power trains can cause torsional interaction between power system components and the mechanical drive train. For example, if one of the natural frequencies of the mechanical drive train is excited to a torsional resonance, the resulting alternating mechanical torque can reach values that can damage or cause fatigue in components of the rotor system.

BRIEF DESCRIPTION OF THE INVENTION

In one aspect, the present disclosure relates to a generator assembly including a first generator, a second generator, and a drive train mechanically coupling the first generator and the second generator. A damping module operably couples to the first generator and the second generator. The damping module is configured to receive a first signal indicative of a first load on the first generator and to receive a second signal indicative of a second load on the second generator and configured to reduce a torsional oscillation of the first and second generators.

In another aspect, the present disclosure relates to a generator assembly including a first generator, a second generator, and a drive train mechanically coupling the first generator and the second generator. A damping module operably couples to the first generator and the second generator. The damping module is configured to vary a damping gain on one of the first generator or the second generator to reduce a torsional oscillation of the first and second generators.

In yet another aspect, the present disclosure relates to a generator assembly including a first generator, a second generator, and a drive train having a rotating shaft, where the drive rain mechanically couples to the first and second generators. The generator assembly includes a damping module configured to receive a first signal indicative of a first torsional oscillation on the first generator and configured to receive a second signal indicative of a second torsional oscillation on the second generator and configured to vary a damping gain on the first and second generators to reduces torsional oscillations of the first and second generators.

DETAILED DESCRIPTION OF THE INVENTION

Figure 1:
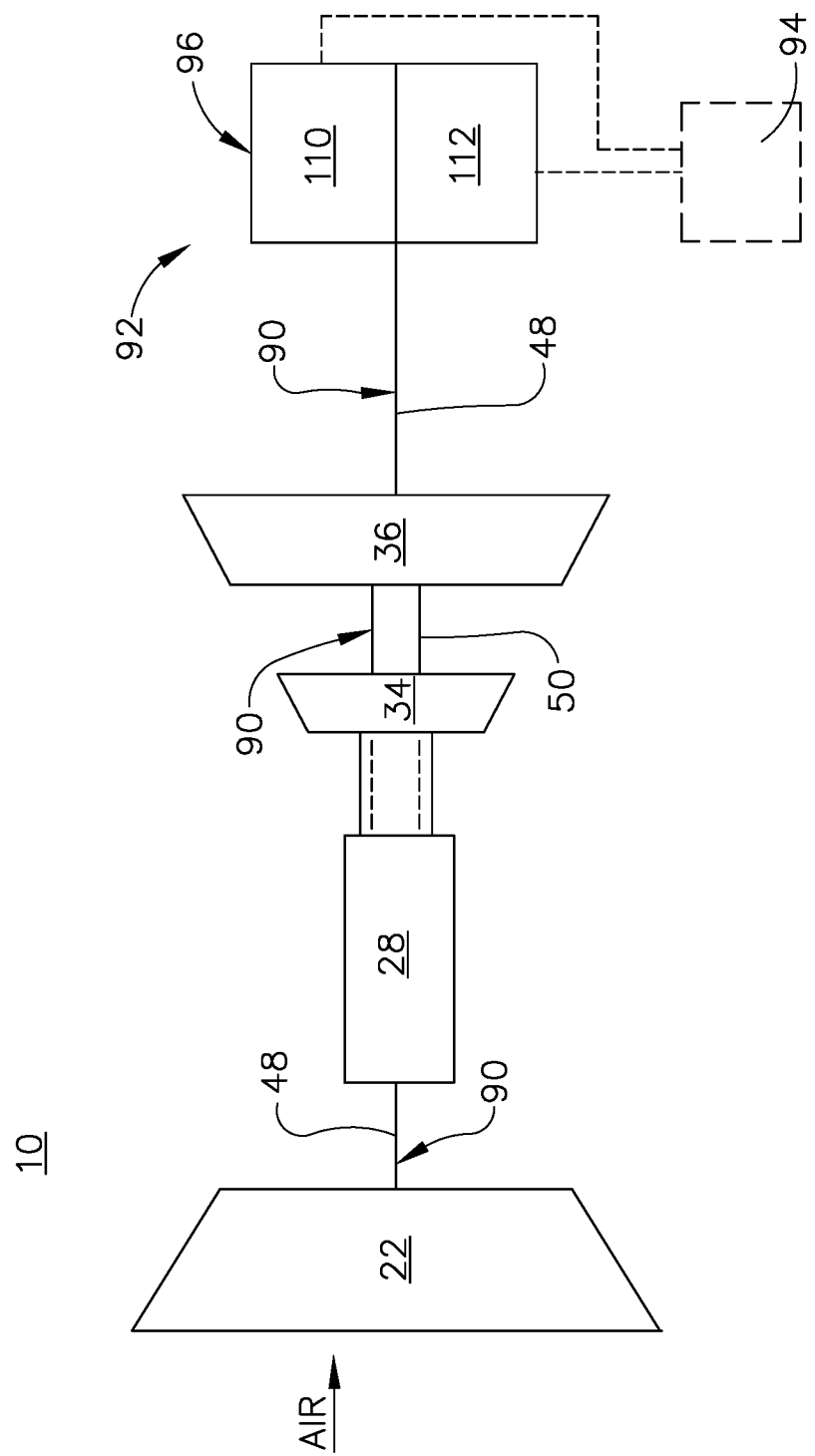
FIG. 1 is a schematic of a turbine engine including a generator assembly with a damping module in accordance with various aspects described herein.

Aspects of the disclosure described herein are directed to an assembly having two rotating machines including, but not limited to, a generator assembly for a turbine engine having at least two generators coupled to a drive train. For purposes of illustration, the present disclosure will be described with respect to the turbine engine as an aircraft gas turbine engine. It will be understood, however, that aspects of the disclosure described herein are not so limited and may have general applicability within other engine environments, as well as in non-aircraft applications, such as other mobile applications and non-mobile industrial, commercial, and residential applications.

As used herein, the term "forward" or "upstream" refers to moving in a direction toward the engine inlet, or a component being relatively closer to the engine inlet as compared to another component. The term "aft" or "downstream" used in conjunction with "forward" or "upstream" refers to a direction toward the rear or outlet of the engine or being relatively closer to the engine outlet as compared to another component.

Additionally, as used herein, the terms "radial" or "radially" refer to a dimension extending between a center longitudinal axis of the engine and an outer engine circumference. Additionally, a set as used herein refers to any number of units, including one or more.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

FIG. 1, a schematic representation of an engine 10 including a drive train interconnecting a compressor section 22, a combustion section 28, a high-pressure turbine 34, and a low-pressure turbine 36 in axial arrangement. The drive train 90 can include rotating elements such as a high-pressure spool 48 or a low-pressure spool 50 about which elements of the engine 10 can rotate, or can be mechanically driven by the same. By way of non-limiting example, the drive train 90 can include a common drive shaft rotatably driven during operation of the engine 10. A generator assembly 92 can also be operably coupled to the drive train 90 at the common shaft. While illustrated that the generator assembly 92 couples to the drive train 90 aft of the low-pressure turbine 36, it should be understood that the generator assembly 92 can be positioned anywhere along the drive train 90, such as to the high-pressure spool 48 or the low-pressure spool 50 anywhere axially along the engine 10. For example, the generator assembly 92 could couple to the high-pressure spool 48 between the compressor section 22 and the combustion section 28.

By way of non-limiting illustration, a damping module 94 is configured to generate a control signal and communicatively coupled to two generators 96 at least partially forming the generator assembly 92, having a first generator 110 and a second generator 112. While shown as two generators 96, it should be understood that two or more generators 96 can be included. The damping module 94 can be an electrical system coupled to the generator assembly 92 and configured to reduce torsional oscillations on the two generators 96.

During generation of electrical energy, the first and second generators 110, 112 are loaded with a constant power and can become less stable, behaving like a negative damper at the drive train 90, which provides a negative resistive force against the driving force of the drive train 90. Such instability can manifest as torsional oscillations. Torsional oscillations as described herein are torsional harmonics on a rotating element manifested as periodically varying torsional strain. Such torsional oscillations are readily measurable as variable rotational speeds or variable torque. The negative damping effect can energize the natural mechanical oscillations at the drive train 90. While the first and second generators 110, 112 are coupled to the same drive train 90, they are separately loaded and can generate torsional oscillation resulting in both speed oscillation, torque oscillation, or lateral vibration on portions of the drive train 90 including drive shaft(s) forming a portion thereof.

It should be understood that the turbine engine environment is for example only. The first and second generators 110, 112 can be provided in any suitable machine having a rotating assembly with a shared drive that can be utilized to drive the generators 110, 112.

Figure 2:
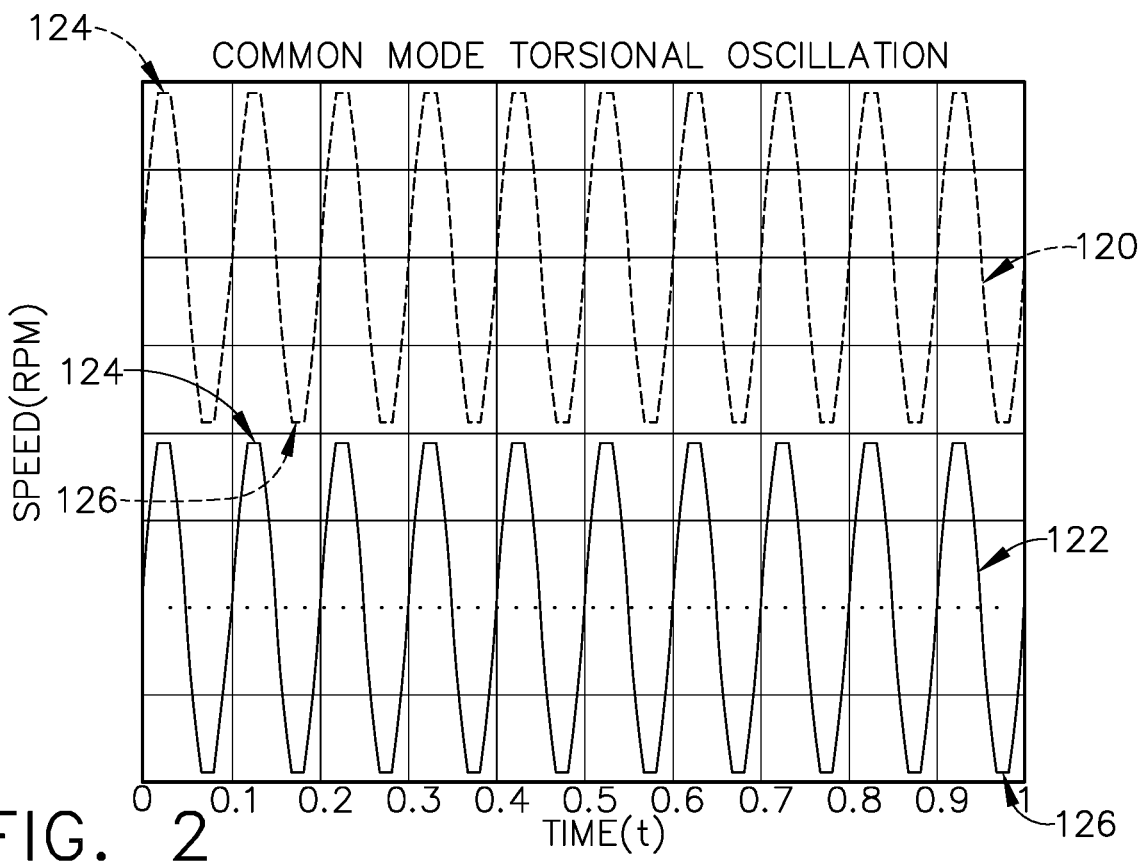
FIG. 2 is an exemplary plot illustrating common mode torsional oscillation of the generator assembly of FIG. 1.
Figure 3:
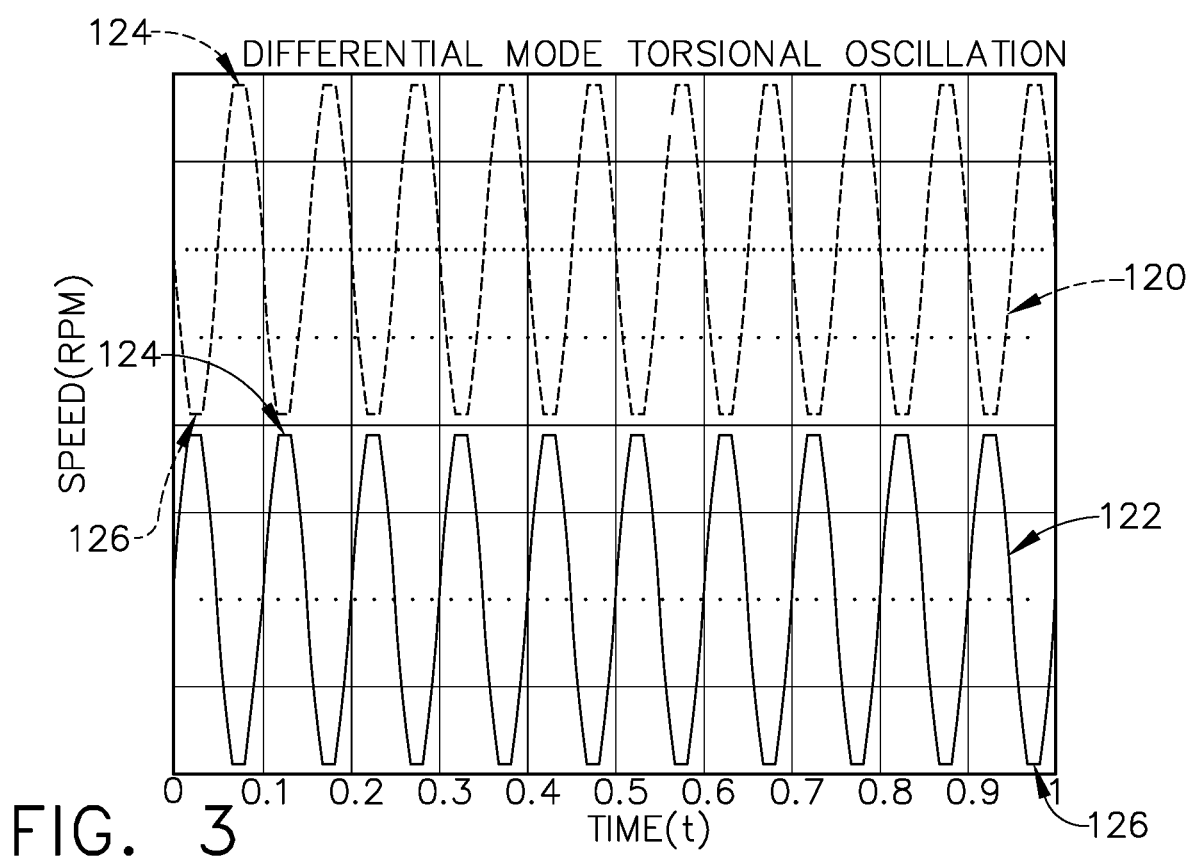
FIG. 3 is an exemplary plot illustrating differential mode torsional oscillation of the generator assembly of FIG. 1.
Figure 4:
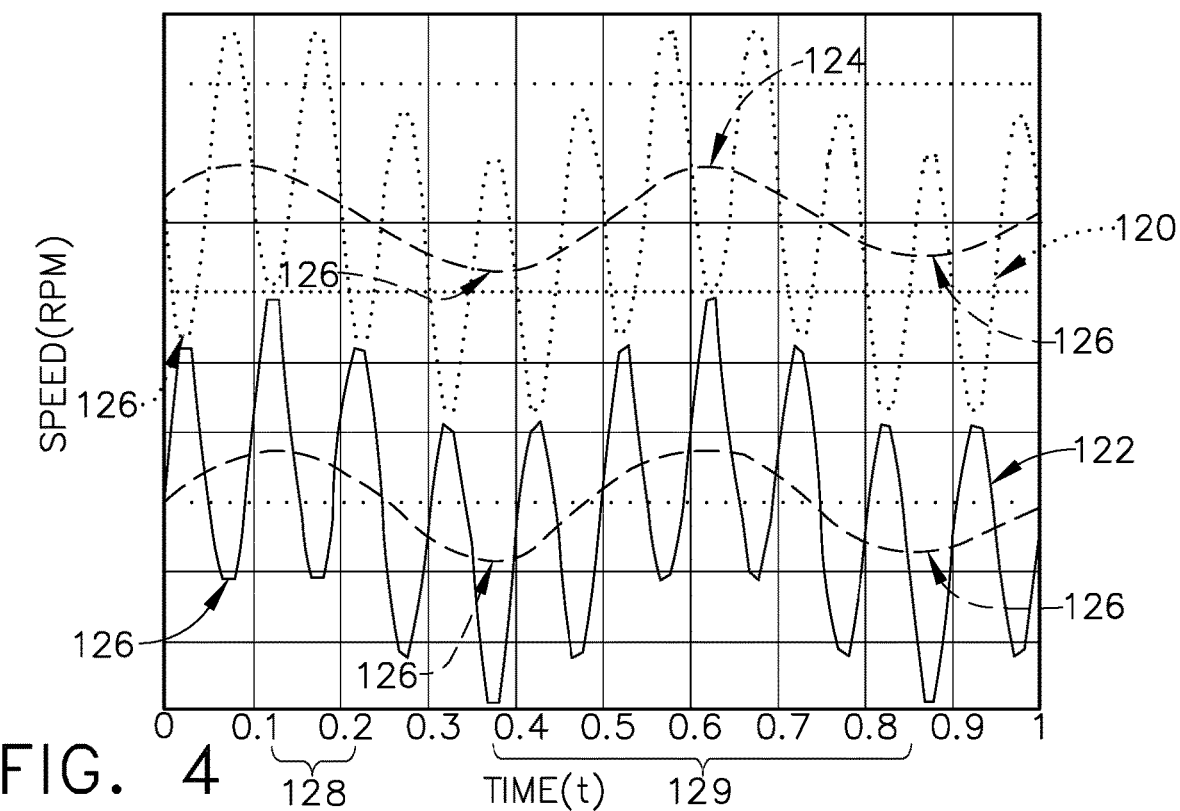
FIG. 4 is an exemplary plot illustrating both common mode and differential mode torsional oscillations of the generator assembly of FIG. 1.

Turning now to FIGS. 2-4, three different plot graphs illustrate three types of torsional oscillations that can be experienced by the drive train 90 of FIG. 1 coupled to the first and second generators 110, 112. The three different plots illustrate the torsional oscillations as rotational speed of the generators 110, 112 over time. FIG. 2 illustrates a plot graph showing a common mode torsional oscillation. A first plot 120 can be representative of the torsional oscillations generated by the first generator 110 and a second plot 122 can be representative of the torsional oscillations generated by the second generator 112. Such torsional oscillations are visible as sinusoidal variations in rotational speed of the first and second generators 110, 112 in the first and second plots 120, 122, respectively. Under common mode torsional oscillations, the first plot 120 and the second plot 122 are in phase, having local maxima 124 and minima 126 that occur at the same time, and can increase and decrease with one another relative to time.

FIG. 3 illustrates a plot graph showing differential mode torsional oscillations. FIG. 3 can be substantially similar to that of FIG. 2, except that the first plot 120 and the second plot 122 are out of phase, where a local maxima 124 of one generator occurs at the same time as the local minima 126 of the other generator. As such, while the rotational speed of one generator increases, the other decreases, and vice versa. Differential mode torsional oscillations can be resultant of asymmetry of the mechanical system, such as the drive train 90 or interconnected components, or an asymmetry in the generator loading.

FIG. 4 illustrates a plot graph showing a combined common mode torsional oscillation and differential mode torsional oscillation. It should be appreciated that utilizing more than one generator can generate both types of torsional oscillation simultaneously. At a first frequency 128 of 2 Hertz (Hz), the first and second generators 110, 112 are oscillating out of phase having differential mode torsional oscillations, having asymmetric maxima 124 and minima 126, represented by the first and second plots 120, 122 at the dotted and solid lines, respectively. Simultaneously, at a second frequency 129 of 10 Hz, the first and second generators 110, 112 are oscillating in phase, having common mode torsional oscillations represented by the first and second plots 120, 122 along the dashed lines having complementary maxima 124 and minima 126. Thus, it should be understood that when utilizing multiple generators, torsional oscillations having different frequencies and phases can be experienced simultaneously.

Figure 5:
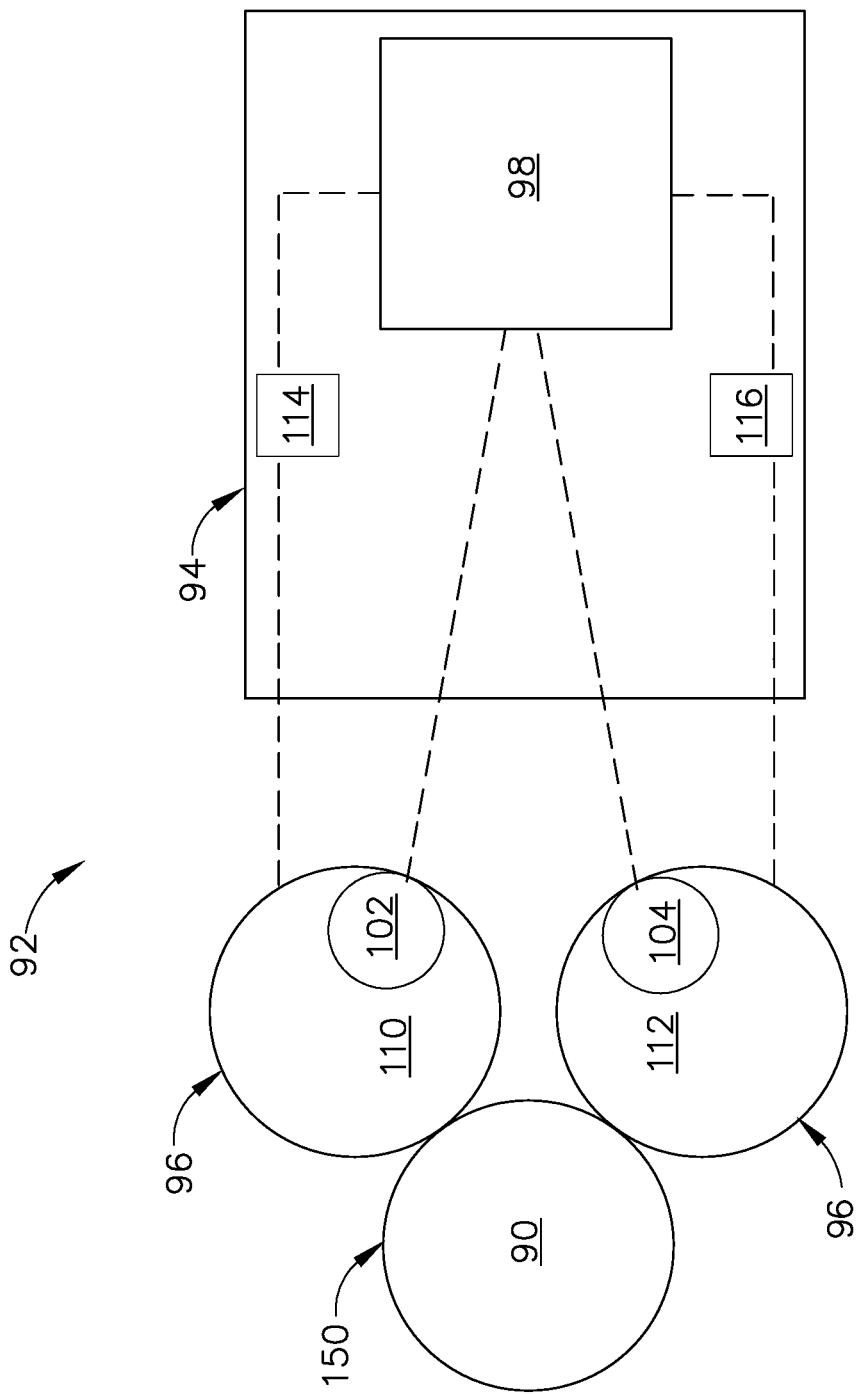
FIG. 5 is a schematic view of the generator assembly of FIG. 1 illustrating an open-loop system including two generators coupled to a drive train via a drive shaft and operably coupled to a damping module in accordance with various aspects described herein.

FIG. 5 illustrates a schematic diagram of the generator assembly 92 including the first and second generator 110, 112 coupled to the drive train 90. The drive train 90 can include a rotating drive shaft 150, or otherwise, to drive the first and second generators 110, 112. The first generator 110 and the second generator 112 couple to the damping module 94. It will be understood that the drive train 90 can be any suitable drive train 90 including that the two generators 96 can be driven in series or in parallel by way of non-limiting examples.

The damping module 94 can include a first load sensor 114 communicatively coupled to the first generator 110 and a second load sensor 116 communicatively coupled to the second generator 112, respectively. While illustrated as two sensors provided within the damping module 94, any number of sensors are contemplated complementary to any number of generators. The first and second load sensors 114, 116 can measure and determine load information from the individual generators 110, 112. Such measurements, in non-limiting examples, can include an electrical load, a resistive load, a constant power load, or a power generated by the first and second generators 110, 112. While the first and second load sensors 114, 116 are illustrated as part of the damping module 94, it should be appreciated that sensors can be external to the damping module 94, such as provided within the first and second generators 110, 112.

A control module 98 can be included in the damping module 94 to receive and interpret measurements from the first and second load sensors 114, 116 in the form of signals. Alternatively, the control module 98 can be separate from or can include the damping module 94. It will be understood that the both the damping module 94 and the control module 98 can be configured in any suitable way including that either or both can be provided with a memory or a central processing unit (not shown). Any memory may be used for storing control software that is executed by the processor(s). The memory may also be used to store information, such as a database, threshold value(s) or table, and to store data received from one or more components that may be communicably coupled with the module. The memory can include Random Access Memory (RAM), Read-Only Memory (ROM), flash memory, or one or more different types of portable electronic memory, such as discs, DVDs, CD-ROMs, etc., or any suitable combination of these types of memory. It will be understood that the modules can include or be associated with any suitable number of individual microprocessors, power supplies, storage devices, interface cards, and other standard components and that the modules can include or cooperate with any number of software programs (e.g., flight management programs) or instructions designed to carry out the various methods, process tasks, calculations, and control/display functions necessary for operation of the generator assembly 92.

A first damper 102 and a second damper 104 can be included in the first and second generators 110, 112, respectively. Alternatively, it is contemplated that a single damper can be utilized with both the first and second generators 110, 112, communicatively coupled to and external of the generators. The first and second dampers 102, 104, in a non-limiting example, can each include a resistor.

In operation, the drive train 90 mechanically couples to the first generator 110 and the second generator 112 to drive the first and second generators 110, 112. The driven first and second generators 110, 112 can generate electrical energy by converting mechanical energy from the drive train 90 into electrical energy. The first and second load sensors 114, 116 can measure the load at the first and second generators 110, 112, respectively. The damping module 94 can interpret the signals from the first and second load sensors 114, 116 at the control module 98 if included. The damping module 94 or control module 98 can operate the first and second dampers 102, 104 to increase or decrease the damping gain at the first generator 110 or the second generators 112 based upon the signals received at the first or second load sensors 114, 116. With such an organization, the damping module 94 can use the load information received by the first and second load sensors 114, 116 to selectively, dynamically modify the single generator common mode damping gains without amplifying the differential mode oscillations.

The generator assembly 92 as illustrated in FIG. 5 is an open-loop system. In this system, the damping gains of the two generators 96 are adjustable by the damping module 94 based upon the load at each of the first and second generators 110, 112. The damping module 94 can increase a damping gain to one of the first or second generators 110, 112 having the lesser load, and decrease a damping gain to the other of the first or second generators 110, 112 having the greater load. This forms an open-loop system wherein the damping module 94 does not require any mechanical, torsional information from the first or second generators 110, 112 as feedback. The damping gain adjustment at the first and second generators 110, 112 can be calculated and verified at the damping module and can greatly reduce or elimination both common mode and differential mode torsional oscillations.

Figure 6:
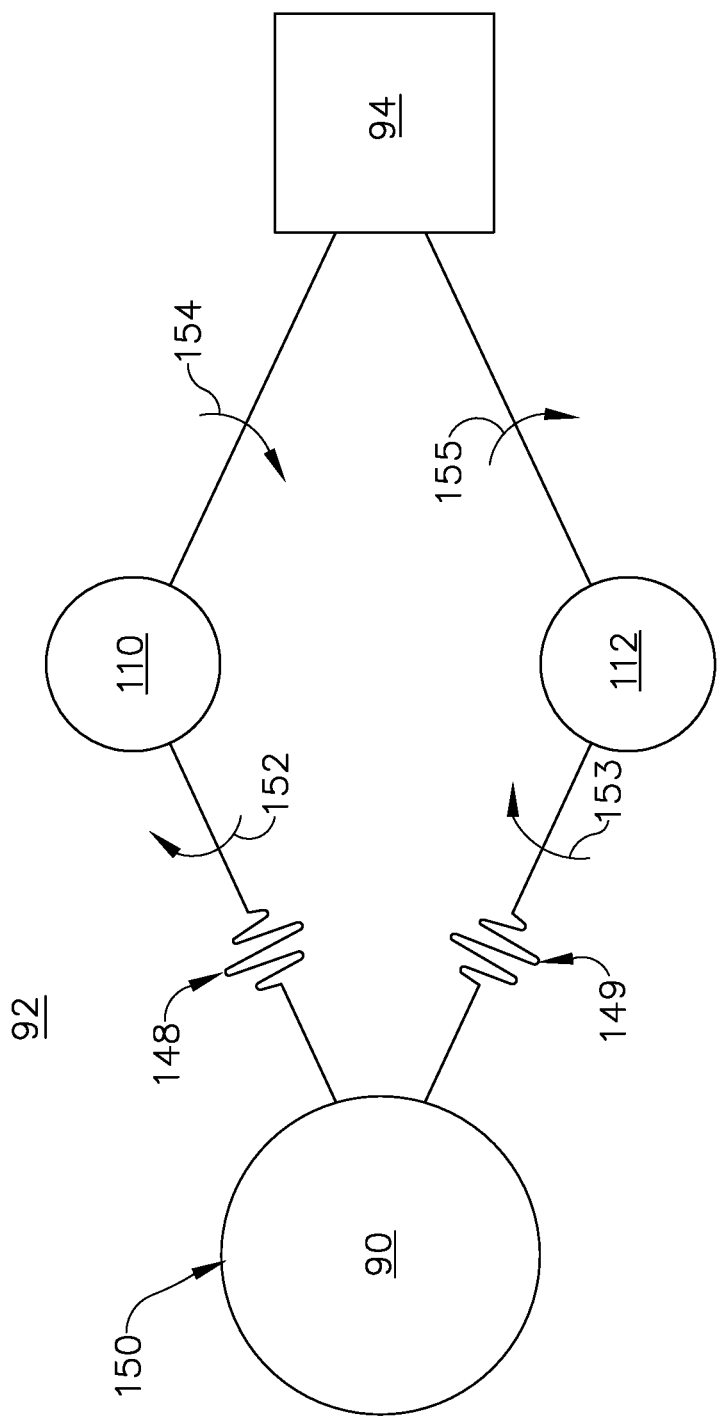
FIG. 6 is a schematic view of the drive train of FIG. 3 coupled to the two generators illustrating the load torque and the drive torque acting on the drive shaft.

Referring now to FIG. 6, first torsional oscillations 148 can be experienced by the first generator 110 and second torsional oscillations 149 can be experienced by the second generator 112, coupled to the drive train 90. A first drive torque 152 is produced by the drive train 90 to drive the first generator 110, and a second drive torque 153 is produced by the drive train 90 to drive the second generator 112. A first load torque 154 at the first generator 110 and a second load torque 155 at the second generator 112 operate as a negative damper to decelerate the first and second generators 110, 112 while converting mechanical energy into electrical energy. The load torque 154, 155 is an effective force in a direction opposite of the drive torque 152, 153. The load torque 154, 155 can be constant to generate a constant load from the first and second generators 110, 112. When the individual torsional oscillations 148, 149 occur, the drive torque 152, 153 for each generators 110, 112 can have an oscillatory waveform, even though the load torque 154, 155 at each generator 110, 112 remains constant. When torsional oscillations 148, 149 occur, the damping gains can be used to modify the load torque 154, 155 at the damping module 94. When the damping gains are modified, the load torque 154, 155 increases or decreases which can vary the rotational force at the generator, which can be used to reduce that oscillations generated by the driving torque 152, 153. Such an increase or decrease in the load torque 154, 155 can be accomplished by, for example, changing the damping gains using an output voltage of the first or second generator 110, 112 that supplies power to resistive loads. As such, a change in the output voltage by the damping module 94 can impact the load torque 154, 155 to directly impact the torsional oscillations 148, 149 relative to the drive torque 152, 153 for the first and second generators 110, 112. Thus, increasing or decreasing the load torque 154, 155 by selectively damping the first and second generators 110, 112 can be used to reduce the torsional oscillations 148, 149.

Figure 7:
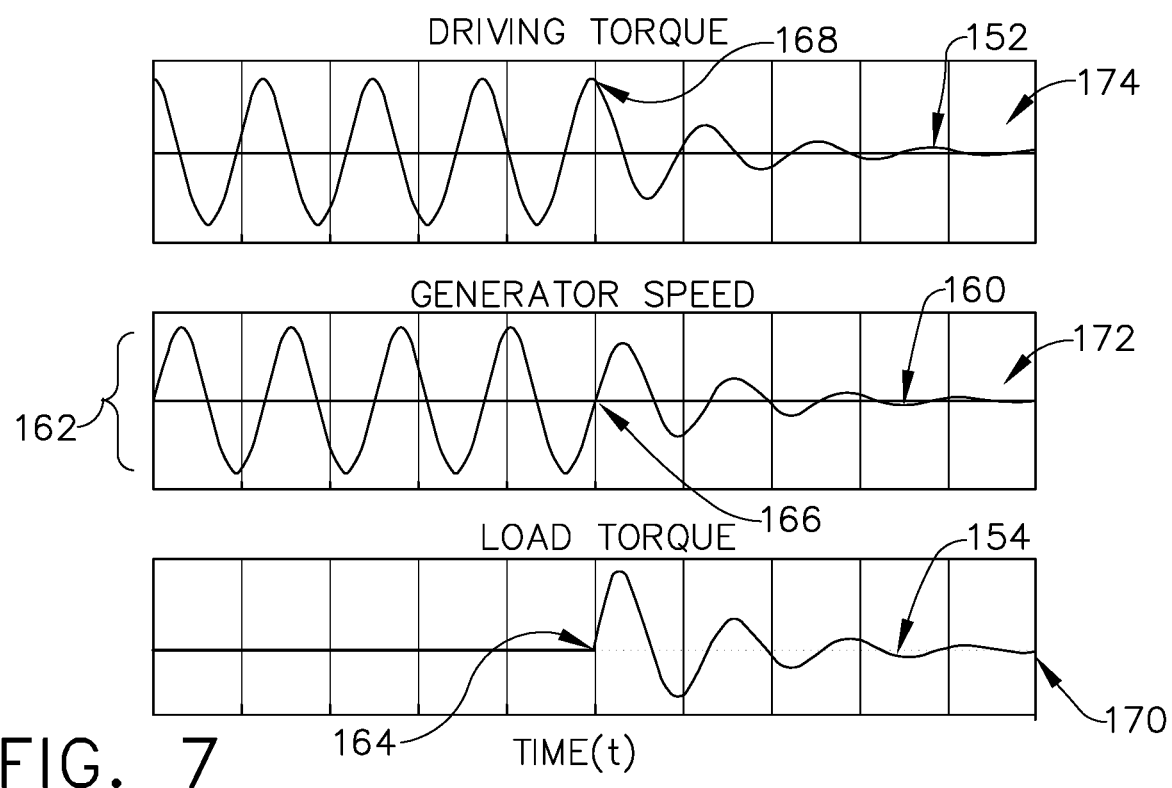
FIG. 7 illustrates three exemplary plots illustrating effects on driving torque and generator speed based upon varying a damping gain visible as a load torque.

Referring now to FIG. 7, three plots are shown representative of an exemplary driving torque 152, a generator rotational speed 160, and the load torque 154. While shown as representative of just one driving torque 152, rotational speed 160, and load torque 154, the discussed concepts can have equal applicability to both generators 110, 112 in a multiple generator system, such as the driving torque 153 and load torque 155 of FIG. 6. During operation, a speed ripple 162, or a change in the generator rotational speed 160, can be measured by the damping module 94 or control module 98 and multiplied by the damping gain. The damping module 94 or control module 98 can increment or decrement the load gain at the load torque 154, which can be accomplished through increasing or decreasing in the output voltage of the first or second generators 110, 112. In a resistive-type load, a positive or increasing speed ripple 162 will result in higher generator voltage, resulting in a higher load power and a higher load torque 154. A negative or decreasing speed ripple 162 results in a lower generator voltage and a lower load torque 154. Utilizing the speed ripples 162, the damping module 94 can increase or decrease the load torque 154 by increasing or decreasing the damping gains and then continuously adjusting the damping gains based upon a measured result of the increase or decrease. This is shown as initially increasing the load torque 154 at 164 when damping begins. Such an increase or decrease can be accomplished with the dampers 102, 104 to damp the first or second generators 110, 112. Damping the generators can regulate the generator speed 160, at 166, to decrease the torsional oscillations at 168, represented by the oscillating driving torque 152.

Alternatively, a load current can be used to dampen the first and second generators 110, 112. A positive speed ripple 162 can result in an increased load current, to increase load power and generate a higher load torque 154. Similarly, a negative speed ripple 162 generates a decrease in current. Such increases and decreases in current can be utilized by the damping module 94 or control module 98 to regulate the driving torque 152 to minimize torsional oscillations.

Damping of the first and second generators 110, 112 can be done continuously, even as the load torque 154 can remain substantially constant, at 170, to maintaining a substantially constant generator rotational speed 160, at 172, and minimizing torsional oscillations, at 174. Substantially constant can include minimal variations in generator speed or driving torque, where slight variations in a generator speed or torque occur within an imperfect mechanical system.

Utilizing damping as described herein to damp two or more generators driven by a common drive shaft can be used to greatly reduce or eliminate torsional oscillations at the generators. Both common mode and differential mode torsional oscillations can be reduced simultaneously. Reduction of the oscillations at the generators can improve mechanical stability of the generator system, and improve overall system efficiency. Furthermore, the shell life of interrelated components can be increased, decreasing required replacement or maintenance costs.

Figure 8:
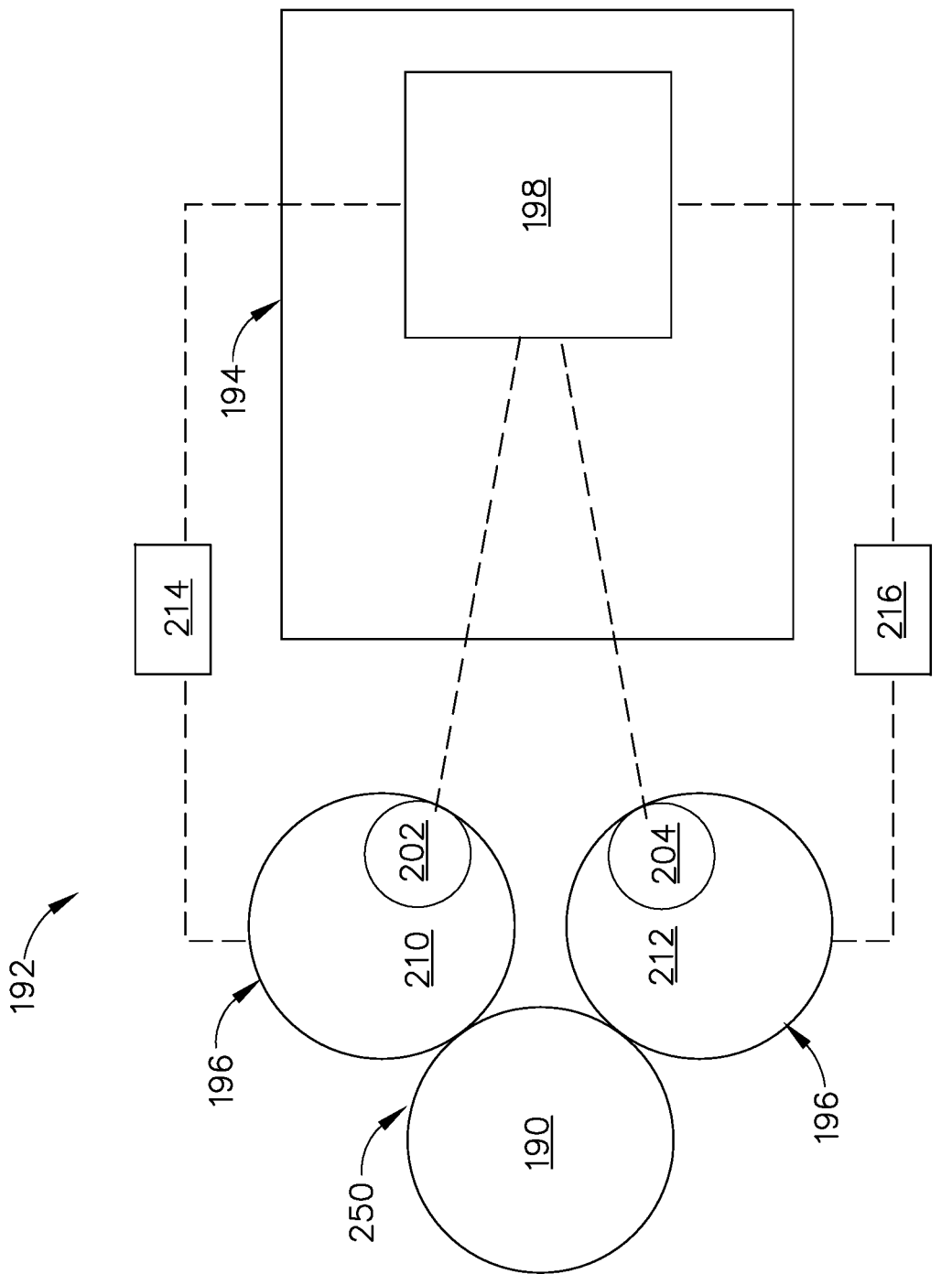
FIG. 8 is a schematic view of an alternative generator assembly of FIG. 1 illustrating a closed-loop system including two generators coupled to a drive train via a drive shaft and operably coupled to a damping module in accordance with various aspects described herein.

FIG. 8 illustrates an alternative generator assembly 192. The generator assembly 192 of FIG. 8 can be substantially similar to that of FIG. 5. As such, similar numerals will be used to identify similar elements, increased by a value of one hundred. The generator assembly 192 includes a first and second generator 210, 212 coupled to a drive train 190. A first damper 202 can be provided in the first generator 210 and a second damper 204 can be provided in the second generator 212. A damping module 194 can couple to the first and second generators 210, 212 and the first and second dampers 202, 204.

A first sensor 214 and a second sensor 216 can communicatively couple to the first generator 210 and the second generator 212, respectively. While illustrated as two sensors, any number of sensors are contemplated complementary to any number of generators. The first and second sensors 214, 216 can measure and determine torsional oscillation information from the individual generators 210, 212. Such information can be determined utilizing, in non-limiting examples, a torque, rotational speed, or lateral vibration of generators 210, 212.

A control module 198 can be included in the damping module 194 to receive and interpret measurements from the first and second sensors 214, 216 in the form of signals. Alternatively, the control module 198 can be separate from or can include the damping module 194. It will be understood that the both the damping module 194 and the control module 198 can be configured in any suitable way including that either or both can be provided with a memory or a central processing unit (not shown). Any memory may be used for storing control software that is executed by the processor(s). The memory may also be used to store information, such as a database, threshold value(s) or table, and to store data received from one or more components that may be communicably coupled with the module. The memory can include Random Access Memory (RAM), Read-Only Memory (ROM), flash memory, or one or more different types of portable electronic memory, such as discs, DVDs, CD-ROMs, etc., or any suitable combination of these types of memory. It will be understood that the modules can include or be associated with any suitable number of individual microprocessors, power supplies, storage devices, interface cards, and other standard components and that the modules can include or cooperate with any number of software programs (e.g., flight management programs) or instructions designed to carry out the various methods, process tasks, calculations, and control/display functions necessary for operation of the generator assembly 192.

In operation, the drive train 190 mechanically couples to the first generator 210 and the second generator 212 to drive the first and second generators 210, 212 to generate electrical energy by converting mechanical energy from the drive train 190 into electrical energy. The first and second sensors 214, 216 can make mechanical measurements of the first and second generators 210, 212, such as rotational speed, torque, or lateral vibration, and provide a signal to the control module 198 representative of such mechanical measurements. The damping module 194 can interpret the signals from the first and second sensors 214, 216 at the control module 198 if included. The damping module 194 or control module 198 can operate the first and second dampers 202, 204 to increase or decrease the damping gain at the first generator 210 or the second generators 212 based upon the signals received at the first or second load sensors 214, 216. With such an organization, the damping module 194 can use the information received by the first and second sensors 214, 216 to selectively, dynamically modify the damping gains to find optimal values for the damping gains based upon the feedback received from the first and second sensors 214, 216 to define a closed-loop. For example, if the damping gains are reduced and an improvement is seen in the feedback from the first and second sensors 214, 216, the damping gains can be continually reduced until the optimal value is found. The measurements can be continuously made and the information from the measurements can be used in the closed-loop to continuously monitor and updated the damping gains to continuously optimize the damping gains based upon both the common mode and differential mode torsional oscillations.

The generator assembly 192 as illustrated in FIG. 8 can be a closed-loop system. In this system, the feedback from the first and second sensors 214, 216 can be used to affect the changes to the damping gains. Based upon resultant changes measured by the first and second sensors 214, 216, the damping gains can be further changed in order to continuously measure and reduce the occurrence of torsional oscillations.

Figure 9:
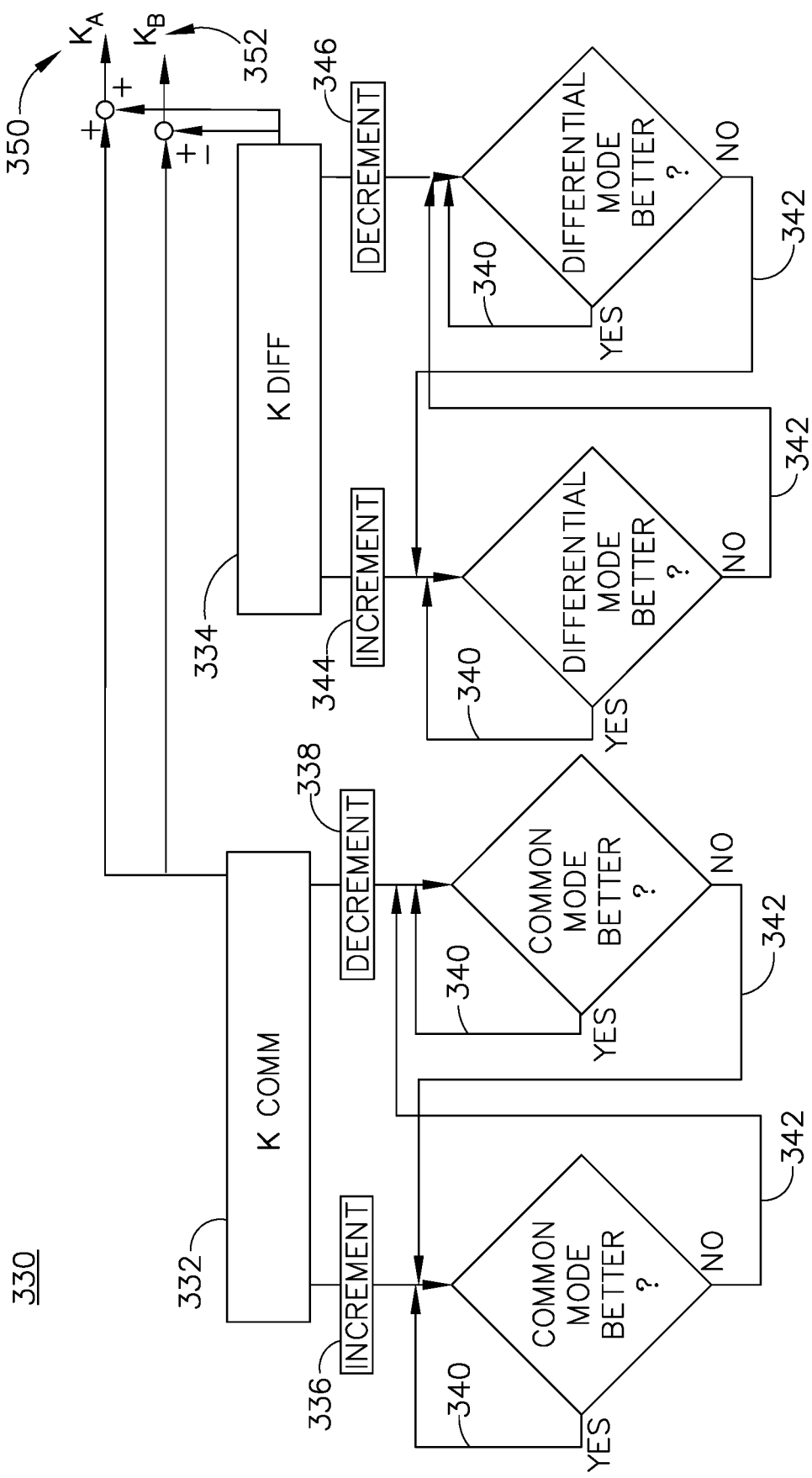
FIG. 9 is a decision chart illustrating increasing or decreasing electrical damping applied to the generators for both common mode and differential mode torsional oscillations in accordance with various aspects described herein.

A method, for example, can be used to vary the damping gains and observe the effects of both the common mode and differential mode torsional oscillations via the first and second sensors 214, 216. In FIG. 9, a method 330 can be utilized to optimize the damping gains based upon the signals representative of the torsional oscillations on a multiple-generator system. The damping method 330 can be effective in reducing both common mode torsional oscillations and differential mode torsional oscillations. A damping module as described herein or similar controller can monitor both the common mode torsional oscillation and differential mode torsional oscillation components based upon a signal received from the generators or measured at one or more sensors. A Kcomm component 332 can represent the common mode damping gains and a Kdiff component 334 can represent the differential mode damping gains. The Kcomm component 332 common mode damping gains can be adjusted based on the averaged torsional oscillation information between measurements among the generators, such as rotational speed, torque, or lateral vibration. The Kdiff component 334 differential mode damping gains can be as adjusted based on the difference of the torsional oscillation information between the same measurements among the generators.

Upon making measurements relating to the common mode torsional oscillations, the common mode component of the damping gains at Kcomm 332 can either increment 336 or decrement. The damping controller then receives an updated signal representative of the common mode torsional oscillations improvement or detriment. After the initial determination to increment 336 or decrement 338 the damping gain, the controller can then continuously increment 336 or decrement 338 the common mode component, Kcomm 332, of the damping gains based upon the measured improvement or detriment to the common mode torsional oscillations. Based upon the initial increment 336, the controller can make a determination if the common mode torsional oscillations have improved 340 or worsened 342. If the common mode torsional oscillations worsen 342, the controller can change to decrement 338 the common mode component, at Kcomm 332, of the damping gains. If the common mode torsional oscillations improve 340, the controller continues to increment 336 the common mode component, at Kcomm 332, of the damping gains until the common mode torsional oscillations no longer improve, and then begin to decrement 338 the common mode component, at Kcomm 332, of the damping gains. Thus, utilizing this decision chart, also known as a feedback loop or a closed-loop, the controller can continuously increment 336 or decrement 338 the common mode component of the damping gains based upon continuous measurements of common mode torsional oscillations to continuously minimize the common mode torsional oscillations.

Similar decisions can be applied to the differential mode torsional oscillations at the Kdiff component 334, and performed in parallel with the common mode torsional oscillations Kcomm component 332. The controller can continuously monitor and increment 344 or decrement 346 the damping gain difference to minimize the differential mode torsional oscillations at the Kdiff component 334. As both the common mode and differential mode torsional oscillations can be monitored in parallel, the decision chart can effectively minimize both types of torsional oscillations simultaneously by selectively increasing or decreasing the damping gains. While this method can be continuous or constant, it can also be turned on/off based upon system need or changes, such as a change in operational demand.

During incrementing 336, 344 and decrementing 338, 346 the common mode component and differential mode component of the damping gains, the overall damping gain 350 for a first generator, shown as $K_A$, is the sum of the Kcomm component 332 and Kdiff component 334 while the damping gain 352 for a second generator, shown as $K_B$, is the difference between the Kcomm component 332 and Kdiff component 334.

Utilizing the method 330 can provide for reducing both the common mode and differential mode components of the torsional oscillations on the system. The common mode torsional oscillations can be the average between the rotational speed, torque, or lateral vibration of the two or more generators, while the differential mode torsional oscillations can be the difference between the rotational speed, torque, or lateral vibration.

With a typical generator damping system, active electrical damping can be used to damp the common mode torsional oscillations. However, when using the active electrical damping, the differential torsional mode oscillations can be excited to an increased severity. As such, the method 330 described can simultaneously and continuously monitor both the common mode and differential mode torsional oscillations and to dynamically modify both types of torsional oscillations in a multiple-generator system.

Utilizing the method as described herein to damp two or more rotating machines driven by a common drive shaft can be used to greatly reduce or eliminate torsional oscillations at the two or more rotating machines. Both common mode and differential mode torsional oscillations can be reduced simultaneously. Reduction of the oscillations at the generators can improve mechanical stability of the rotational assembly, and improve overall system efficiency. Furthermore, the shell life of interrelated components can be increased, decreasing required replacement or maintenance costs.

It should be appreciated that application of the disclosed design is not limited to turbine engines with fan and booster sections, but is applicable to turbojets and turbo engines as well.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A generator assembly, comprising:
   a first generator;
   a second generator;
   a drive train mechanically coupling the first generator and the second generator;
   a damping module operably coupled to both the first generator and the second generator; and
   a damper included with at least one of the first generator or the second generator;
   wherein the damping module is configured to receive a first signal indicative of a first load on the first generator and to receive a second signal indicative of a second load on the second generator, and wherein the damping module is configured to operate the damper to modify an output voltage to change the damping gains for at the at least one of the first generator or the second generator to reduce torsional oscillations of the first generator and the second generator, and wherein the reduced torsional oscillations are independent of a change in power demand from the generator assembly.

2. The generator assembly of claim 1 wherein the damping module further comprises a control module configured to receive the first signal and the second signal indicative of the first and second loads on the first and second generators.

3. The generator assembly of claim 2 wherein the control module is operably coupled to the damping module to operate the damping module to electrically damp the first and second generator to reduce the torsional oscillations of the first and second generators.

4. The generator assembly of claim 2, wherein the damping module further comprises a first load sensor communicatively coupled to the first generator and a second load sensor communicatively coupled to the second generator, and wherein the damping modules is configured to measure the first and second loads on the first and second generators with the first and second load sensors, and to generate the first signal and the second signal indicative of the first load and the second load on the first generator and the second generator.

5. The generator assembly of claim 1 wherein the first and second signals are representative of at least one of a resistive load, a constant power load, or a combination thereof.

6. The generator assembly of claim 1 wherein the damper includes a first damper included with the first generator and a second damper included with the second generator.

7. The generator assembly of claim 6 wherein the damping module is configured to reduce the torsional oscillations by generating a control signal for at least one of the first damper or the second damper.

8. The generator assembly of claim 7 wherein the control signal includes damping gains for the at least one of the first damper or the second damper based on the first signal or the second signal.

9. The generator assembly of claim 8 wherein the control signal comprises damping gains for both the first damper and the second damper.

10. The generator assembly of claim 1 wherein the damping module is configured to reduce both a differential mode torsional oscillation and a common mode torsional oscillation.

11. The generator assembly of claim 1 wherein the first signal and the second signal are representative of a torque, a rotational speed, or a lateral vibration of the first and second generators.

12. The generator assembly of claim 1 wherein the first signal and the second signal are continuously received at the damping module.

13. A generator assembly, comprising:
a first generator having a first damper;
a second generator having a second damper;
a drive train mechanically coupling the first generator and the second generator; and
a damping module operably coupled to both the first generator and the second generator; and
wherein the damping module is configured to vary a damping gain on one of the first damper of the first generator or the second damper of the second generator to modify a corresponding output voltage to change the damping gains at one of the first generator or the second generator to reduce a torsional oscillation of the first generator and the second generator, and wherein the reduced torsional oscillation is independent of a change in power demand from the generator assembly.

14. The generator assembly of claim 13 wherein the damping module is configured to vary a damping gain on both the first generator and the second generator.

15. The generator assembly of claim 13 wherein the first damper is configured to vary the damping gain on the first generator and the second damper is configured to vary the damping gain on the second generator.

16. The generator assembly of claim 13 wherein varying the damping gain reduces torsional oscillations for common mode torsional oscillations.

17. A generator assembly, comprising:
a first generator including a first damper configured to generate a first output voltage on the first generator;
a second generator including a second damper configured to generate a second output voltage on the second generator;
a drive train having a rotating shaft, where the drive train mechanically couples to the first and second generators; and
a damping module configured to receive a first signal indicative of a first torsional oscillation on the first generator and configured to receive a second signal indicative of a second torsional oscillation on the second generator and configured to vary a damping gain on at least one of the first generator or the second generator by way of controllably operating at least one of the first damper to generate a first damping gain output voltage on the first generator or a second damping gain output voltage on the second generator to regulate a respective generator speed to reduce torsional oscillations of the first generator and the second generator, and wherein the reduced torsional oscillations are independent of a change in power demand from the generator assembly.

18. The generator assembly of claim 17 wherein the damping module is configured to simultaneously reduce both differential mode torsional oscillation and common mode torsional oscillation.

19. The generator assembly of claim 17, further comprising a first sensor coupled to the first generator and a second sensor coupled to the second generator.

20. The generator assembly of claim 19 wherein the first sensor generates the first signal indicative of the first torsional oscillation on the first generator and the second sensor generates the second signal indicative of the second torsional oscillation on the second generator.

21. The generator assembly of claim 20 wherein the first sensor and the second sensor are configured to measure one of a rotational speed, a torque, or a lateral vibration of the first and second generators.

22. The generator assembly of claim 17 wherein the first damper is configured to vary the damping gain on the first generator and the second damper is configured to vary the damping gain on the second generator.

23. The generator assembly of claim 17 wherein the first and second signal are provided in a closed-loop feedback and the damping gains are varied based upon the first and second signal.

24. The generator assembly of claim 23 wherein the first and second signal are continuously received at the damping module.

25. The generator assembly of claim 1, wherein the damper is a resistive element.

* * * * *